UNITED STATES PATENT OFFICE.

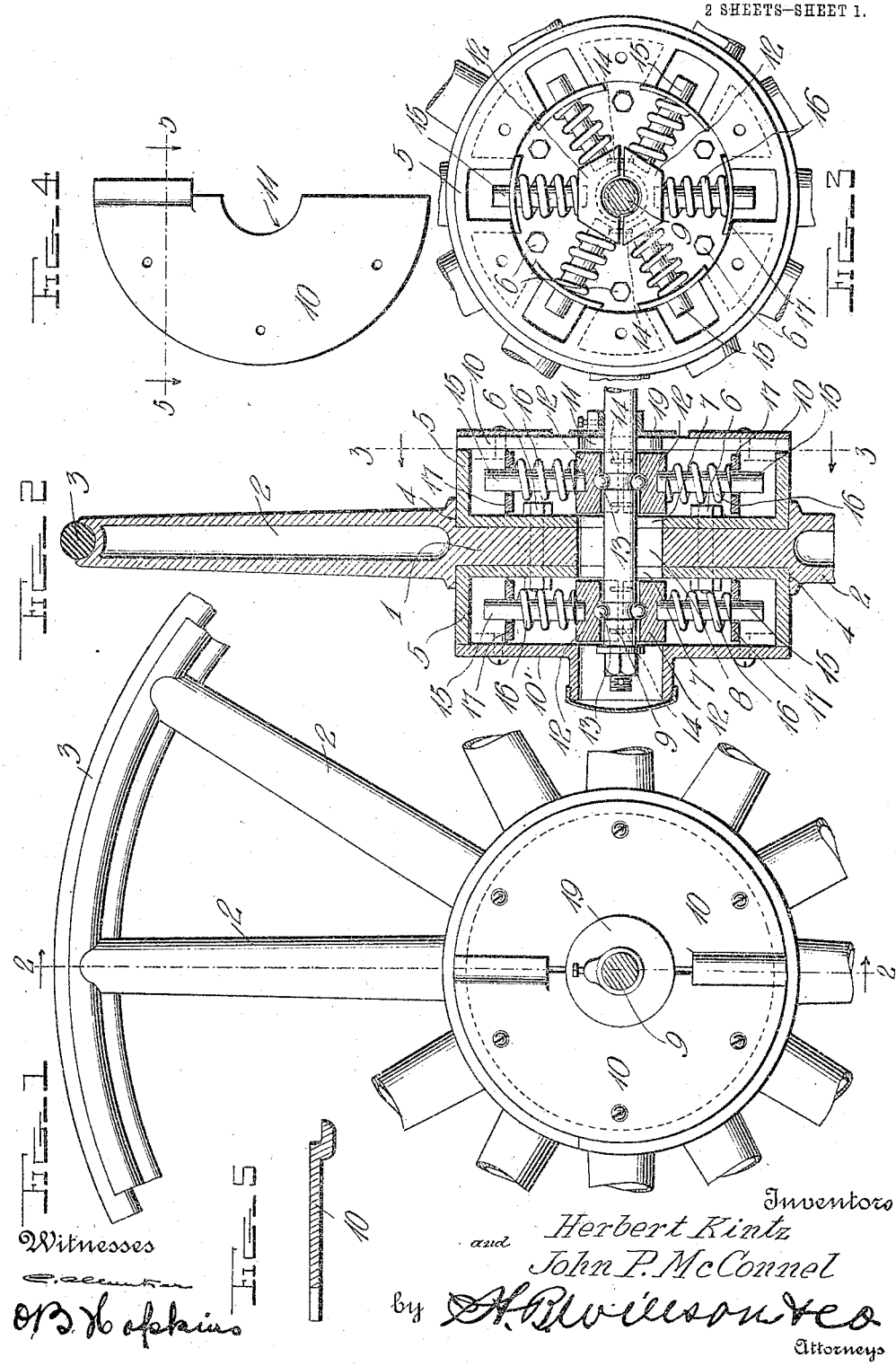

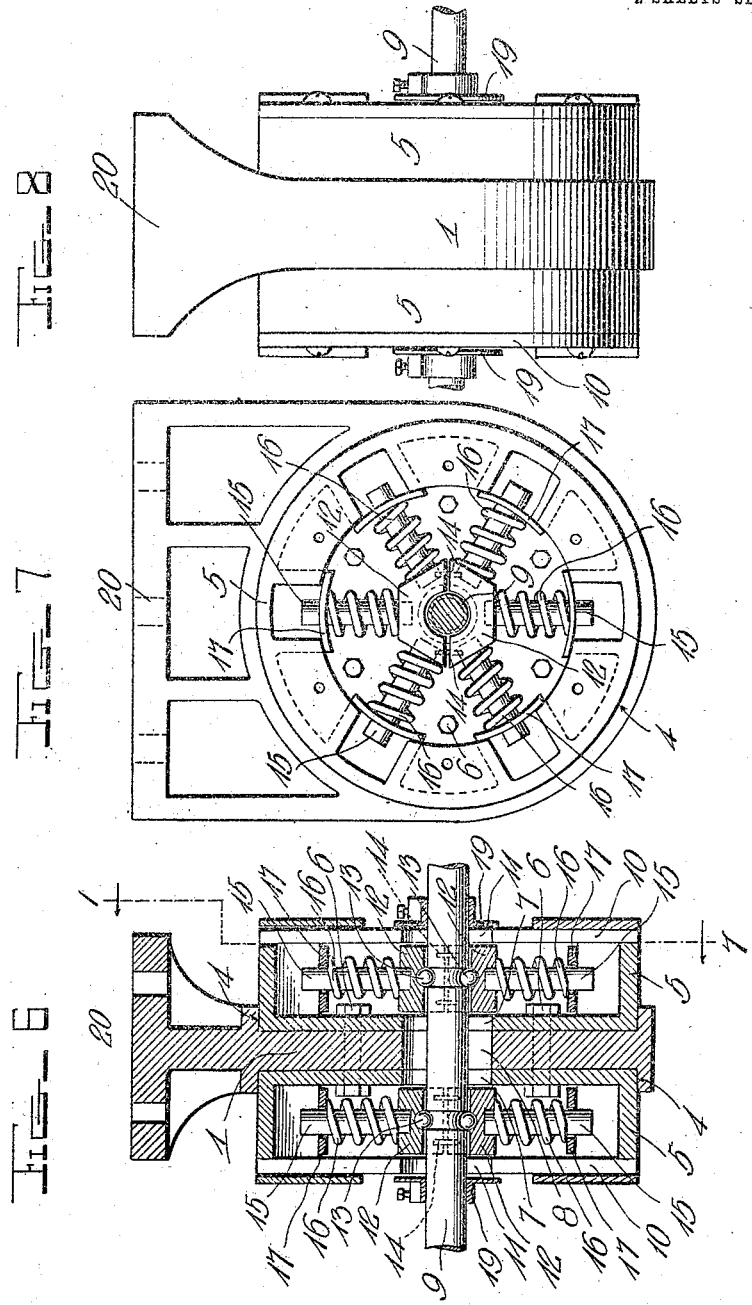

HERBERT KINTZ, OF SHARPSBURG, AND JOHN P. McCONNEL, OF PITTSBURG, PENNSYLVANIA.

WHEEL-HUB AND AXLE-BEARING.

995,608.  Specification of Letters Patent.  Patented June 20, 1911.

Application filed February 16, 1910.  Serial No. 544,248.

*To all whom it may concern:*

Be it known that we, HERBERT KINTZ and JOHN P. McCONNEL, citizens of the United States, residing at Sharpsburg and Pittsburg, respectively, in the county of Allegheny and State of Pennsylvania, have invented certain new and useful Improvements in Wheel-Hubs and Axle-Bearings, of which the following is a specification.

Our invention pertains to certain new and useful improvements in vehicles, being more particularly adaptable for use in connection with the wheel hubs and axle bearings, involving the use and arrangement of a resilient means to absorb or lessen the jar or shock imparted to the vehicle when running over uneven surfaces.

Our device will be especially advantageous when applied to vehicles of the automobile or motor driven class, or in fact any vehicle using rubber tires, and aims to dispense with the expensive pneumatic tires now commonly used.

It will also be practical to employ our device in connection with steel tired vehicles.

The fundamental object of our invention is to provide a reliable cushioning device in conjunction with the hub and axle, whereby a large percentage of the shock or jar will be taken up and absorbed by the resilient elements used as a part of our invention.

In the accompanying drawings forming a part of this specification Figure 1 is a fragmental section of a vehicle wheel showing exterior of enlarged hub for housing the resilient elements. Fig. 2 is a vertical transverse section of a wheel showing details of interior construction of the hub. Fig. 3 is a front elevation of the hub with cap removed. Fig. 4 shows one-half section of a removable cap member. Fig. 5 is a transverse section taken on the line 5—5 of Fig. 4; Fig. 6 is a transverse section of our resilient axle bearing, separate from the wheel, and supported by a bracket. Fig. 7 shows a front elevation of the same with cap removed. Fig. 8 is an end elevation of the same.

Numerals of reference designate like parts throughout the several views, in which 1 represents the central securing portion of a vehicle wheel hub or bracket; 2 the spokes radiating therefrom, and 3 the rim or tire securing portion thereof. It is obvious that one or more sheets of metal could replace the spokes without departure from the spirit of the invention. The said central part 1 of our device is provided with suitable circular cored-out recesses 4, one at each side, the circumferential size and depth of which may vary with different styles and sizes of wheels, and into these recesses are placed suitable drums 5, the same being secured in position by means of bolts 6, or other adequate means. Suitable sized apertures 7 are provided in the central part of the securing face of said drums which register with the central cored-out opening 8 formed in the part 1, to allow for the insertion and movement therein of the axle 9.

Forming the outer face or wall of each drum are the removable cap members 10, which are preferably constructed in two sections as shown in Fig. 4, for convenience of attachment and removal. The outside cap 10' of the form shown in Fig. 2 is preferably made in one piece. Said cap members are also provided with apertures 11, corresponding in size to those formed in the central portion 1 and drums 5, being in alinement therewith, to allow for the free insertion and movement of said axle 9. Surrounding the said axle, and occupying practically the full width of the space between the inner and outer walls of the drums 5, are the divided halves of hexagon shaped bearing blocks 12, a ball race being preferably provided in the contacting face of each half section which registers with a similar race in the axle, for the reception of suitable non-friction balls or rollers 13. The two halves of each block 12, which may be of any configuration other than hexagon, are held together by pins 14, but are left free for transverse movement toward and away from each other; as will be more fully explained farther on. Secured in each flat face, or segment of said bearing blocks, are suitable pins 15, which extending radially outward a predetermined distance, their outer ends being normally spaced apart from the concave surface of the drum, when brought into engagement with the wall of the drum 5, limiting the movement of said block segments 12. Surrounding each of said pins 15 are the spiral spring members 16, one end of which engages the block 12, and the other end bearing against a washer or buffer plate 17, engaged by the said pins 15 which extend through holes in the plates, and enter the U-shaped apertures, between the said shoulders. The form of spring shown as spiral is not essential to the successful carrying out of our invention, as any other suitable form of spring or elastic means could be substituted, and the desired result be accomplished. The said segmental plates 17 engage shoulders or flanges 18 formed as an integral part of, and extending inwardly from, the inner circumferential face of the drum members 5, which serve to hold said washers against radial displacement by the tension spring members; according to a well known mechanical principle. The pins 15 are of less length or extent than the radii of the interior concave surface of the drum 5, thereby providing a space between the end of said pins and the said concave surface, for allowing limited play of the bearing blocks relative to the said drum. A collar 19 seated over and secured to the axle serves as a washer to exclude dirt from the interior of the drum.

The operation, and practical results obtained by the use of our invention, when the component parts are combined and assembled approximately as shown and described, will be as follows:—The shock or jar imparted to the vehicle when running over uneven surfaces will be transmitted partly to the vehicle springs and the remainder or surplus will be taken up and absorbed by the resilient elements positioned in the wheel hub or axle bearing, in the following manner: The variable movement of the axles, both front and rear, when responding to the rise and fall of the vehicle in running over uneven surfaces, will set up a vibratory action of the resilient elements. The limit of movement afforded to the axle in the hub, or hung bearing, by the apertures 8 and 11 will be sufficient to cause the tension members responding to either slight or intense shocks. No matter how slight the movement may be the axle will exert either an upward or downward pressure on the bearing block segments, 12, said action tending to depress the spring members 16 which, when the shock has passed, will react and force the axle back to its normal centralized position. The ends of the pins 15, which will be shoved outward during any movement of the axle, are also allowed a limited free lateral play between the shoulder bearings 18, the buffer plates or washers 17, being adapted to slide on their bearings in the event of any such lateral movement. The axle 9 might be considered as "floating" in the hub, or bearing, and free to move in any direction, its full limit of movement however being governed by the size of the apertures 8 and 11, and consequently no matter from which direction, or how the shock is imparted to the axle or wheels, the resilient elements will instantly respond to the movement of said axle, and as quickly subside when the jar has passed.

The form of wheel shown in Figs. 1 and 2 is intended for the front axle of a motor vehicle, or for all four wheels of any other styles of vehicles. In vehicles of the motor driven class, where the front wheels run free and independent of the axle, our resilient bearing is constructed as the wheel hub, but for the rear it is separate and apart from the wheels, and is positioned on the power driven axle in close proximity to the inner face of said rear wheels. Our bearing in the latter instance would be supported by a suitable bracket 20, the upper portion of which is secured to the vehicle springs.

What we claim as new, and desire to secure by Letters Patent, is:

1. In a vehicle hub, an axle, bearing blocks rotatable on the axle, a drum concentric with the axle and having shoulders on its inner circumferential surface and having U-shaped apertures formed between said shoulders, plates slidable on said shoulders and each having a hole therethrough, radially disposed pins fixed to said bearing blocks and entering said apertures through said holes, said pins being of less radial extent than the internal radii of said inner surface, to allow limited play of the bearing blocks relative to the drum, and springs around said pins interposed between said plates and said bearing blocks for absorbing shock substantially as specified.

2. In a vehicle hub, an axle, bearing blocks rotatable on the axle, a drum concentric with the axle and having shoulders on its inner concave surface and U-shaped apertures between said shoulders, segmental plates spanning said apertures and having slidable movement on said shoulders, each plate having a hole therethrough, pins projecting from said bearing blocks through said holes and entering said apertures, the free ends of said pins being normally spaced apart from the concave surface of said drum for the purpose specified, and springs interposed between the bearing blocks and the plates for absorbing shock.

In testimony whereof we affix our signatures in presence of two witnesses.

HERBERT KINTZ.
JOHN P. McCONNEL.

Witnesses:
  JOH. A. BRODTKORLE,
  J. J. FRANK.